US012784691B2

(12) United States Patent
Kim et al.

(10) Patent No.: US 12,784,691 B2
(45) Date of Patent: Nov. 3, 2026

(54) DISPLAY DEVICE AND DRIVING METHOD THEREOF

(71) Applicant: Samsung Display Co., LTD., Yongin-si (KR)

(72) Inventors: Sung Won Kim, Yongin-si (KR); Ye Eun Kang, Yongin-si (KR); Seung Rae Kim, Yongin-si (KR); Yu Jin Kim, Yongin-si (KR); Woo Geun Lee, Yongin-si (KR); Jae Hyun Lee, Yongin-si (KR); Jin Won Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/037,711

(22) Filed: Jan. 27, 2025

(65) Prior Publication Data

US 2026/0004737 A1 Jan. 1, 2026

(30) Foreign Application Priority Data

Jun. 28, 2024 (KR) ........................ 10-2024-0085714

(51) Int. Cl.
*G09G 3/3266* (2016.01)
*G09G 3/3233* (2016.01)
*G09G 3/3291* (2016.01)

(52) U.S. Cl.
CPC ......... *G09G 3/3266* (2013.01); *G09G 3/3291* (2013.01); *G09G 2300/0819* (2013.01); *G09G 2300/0842* (2013.01); *G09G 2310/08* (2013.01); *G09G 2320/0233* (2013.01)

(58) Field of Classification Search
CPC .................................................... G09G 3/3266
See application file for complete search history.

(56) References Cited

U.S. PATENT DOCUMENTS

| | | | | |
|---|---|---|---|---|
| 9,111,491 | B2 | 8/2015 | Woo et al. | |
| 10,109,239 | B2 * | 10/2018 | In | G09G 3/3291 |
| 10,262,588 | B2 * | 4/2019 | Yoon | G09G 3/3233 |
| 11,798,475 | B2 * | 10/2023 | Choi | G09G 3/3225 |
| 2010/0073335 | A1 * | 3/2010 | Min | G09G 3/3233 345/204 |

(Continued)

FOREIGN PATENT DOCUMENTS

| | | |
|---|---|---|
| KR | 102027169 B1 | 10/2019 |
| KR | 102595263 B1 | 10/2023 |
| KR | 102630078 B1 | 1/2024 |

*Primary Examiner* — Sepehr Azari
(74) *Attorney, Agent, or Firm* — CANTOR COLBURN LLP

(57) ABSTRACT

A display device includes a display panel including a first sub-pixel, a gate driver that provides a sensing control signal having a first voltage applied to the first sub-pixel in a first sensing period and a sensing control signal having a second voltage different from the first voltage applied to the first sub-pixel in a second sensing period, a data driver that receives a first sensing voltage from the first sub-pixel through a sensing line in the first sensing period and a second sensing voltage from the first sub-pixel through the sensing line in the second sensing period and a driving controller that controls the data driver and the gate driver and senses a characteristic of the first sub-pixel based on the first sensing voltage and the second sensing voltage.

20 Claims, 13 Drawing Sheets

(56) References Cited

U.S. PATENT DOCUMENTS

| | | | | |
|---|---|---|---|---|
| 2014/0022289 | A1* | 1/2014 | Lee | G09G 3/006<br>345/76 |
| 2014/0176525 | A1* | 6/2014 | Woo | G09G 3/3233<br>345/212 |
| 2015/0325174 | A1* | 11/2015 | Yu | H10K 59/00<br>345/77 |
| 2016/0078813 | A1* | 3/2016 | Mizukoshi | G09G 3/3233<br>438/23 |
| 2017/0031485 | A1* | 2/2017 | Kim | G06F 3/04184 |
| 2017/0039952 | A1* | 2/2017 | Kim | G09G 3/3233 |
| 2017/0061865 | A1* | 3/2017 | Park | G09G 3/325 |
| 2017/0154578 | A1* | 6/2017 | In | G09G 3/3283 |
| 2017/0263181 | A1* | 9/2017 | Jinta | G09G 3/3233 |
| 2019/0035874 | A1* | 1/2019 | Han | H10K 59/1213 |
| 2020/0185481 | A1* | 6/2020 | Park | H10K 59/131 |
| 2022/0013072 | A1* | 1/2022 | Kim | G09G 3/3233 |
| 2022/0020334 | A1* | 1/2022 | Kim | G09G 3/3233 |
| 2022/0051629 | A1* | 2/2022 | Jeong | G09G 3/3233 |
| 2022/0157215 | A1* | 5/2022 | Park | G09G 3/3266 |
| 2022/0208082 | A1* | 6/2022 | Ban | G09G 3/3258 |
| 2022/0351680 | A1* | 11/2022 | Choi | G09G 3/3233 |
| 2022/0375416 | A1* | 11/2022 | Kim | G09G 3/3291 |
| 2023/0057284 | A1* | 2/2023 | Jang | G09G 3/32 |
| 2023/0206839 | A1* | 6/2023 | Oh | G09G 3/3233<br>345/694 |
| 2023/0215382 | A1* | 7/2023 | Hong | G09G 3/3233<br>345/214 |
| 2024/0057418 | A1* | 2/2024 | Wu | H10K 59/1315 |
| 2024/0221663 | A1* | 7/2024 | Kim | G09G 3/3233 |
| 2025/0221046 | A1* | 7/2025 | Jeong | H10D 86/441 |
| 2025/0273148 | A1* | 8/2025 | Kim | G09G 3/3233 |

* cited by examiner

DISPLAY DEVICE AND DRIVING METHOD THEREOF

This application claims priority to Korean Patent Application No. 10-2024-0085714, filed on Jun. 28, 2024, and all the benefits accruing therefrom under 35 U.S.C. § 119, the content of which in its entirety is herein incorporated by reference.

BACKGROUND

1. Field

The invention relates to a display device and a driving method thereof, and more particularly, the to a display device that may sense characteristics of a sub-pixel and a driving method thereof.

2. Description of the Related Art

As information technology has developed, importance of a display device, which is a connection medium between a user and information, has been highlighted. Accordingly, the use of display devices such as liquid crystal display devices, organic light emitting display devices, and inorganic light emitting display devices is increasing.

The display device may include sub-pixels, where each of the sub-pixels may include a driving transistor, a switching transistor, a storage capacitor, and a light emitting element. The threshold voltage and electron mobility of the driving transistor and the characteristics of the light emitting element must be the same for respective sub-pixels because they determine the characteristics of the sub-pixels. However, the characteristics may vary between the sub-pixels due to process characteristics and deterioration characteristics. These differences in characteristics cause luminance deviations, which limit the implementation of desired images. In order to compensate for the luminance deviation between the sub-pixels, the characteristics of the sub-pixels may be sensed, and input image data may be corrected based on the sensing result. However, the sensing data (that is, the sensing voltage) may become distorted due.

SUMMARY

An aspect of the invention provides a display device that senses the characteristics of a switching transistor.

Another aspect of the invention provides a driving method of a display device that drives the display device.

An embodiment of the invention provides a display device including a display panel including a first sub-pixel, a gate driver that provides a sensing control signal having a first voltage applied to the first sub-pixel in a first sensing period and a sensing control signal having a second voltage different from the first voltage applied to the first sub-pixel in a second sensing period, a data driver that receives a first sensing voltage from the first sub-pixel through a sensing line in the first sensing period and a second sensing voltage from the first sub-pixel through the sensing line in the second sensing period and a driving controller that controls the data driver and the gate driver and senses a characteristic of the first sub-pixel based on the first sensing voltage and the second sensing voltage.

In an embodiment, the driving controller may sense a difference between the first sensing voltage and the second sensing voltage as the characteristic of the first sub-pixel.

In an embodiment, the data driver may provide a data voltage to the first sub-pixel through a data line in a display period, and the driving controller may compensate for the data voltage applied to the first sub-pixel based on the characteristics of the first sub-pixel.

In an embodiment, the data voltage may decrease as the difference between the first sensing voltage and the second sensing voltage increases.

In an embodiment, the data driver may provide a reference voltage to the first sub-pixel through a data line in the first sensing period and the second sensing period.

In an embodiment, the gate driver may provide a scan control signal to the first sub-pixel, and the first sub-pixel may include a first transistor including a control electrode connected to a first node, a first electrode connected to a first power line, and a second electrode connected to a second node, a second transistor including a control electrode receiving the scan control signal, a first electrode connected to the data driver through the data line, and a second electrode connected to the first node, a third transistor including a control electrode receiving the sensing control signal, a first electrode connected to the second node, and a second electrode connected to the data driver through the sensing line, a storage capacitor including a first electrode connected to the first node and a second electrode connected to the second node and a light emitting element including a first electrode connected to the second node and a second electrode connected to the second power line.

In an embodiment, each of the first sensing period and the second sensing period may include an initialization period and a sensing input period, wherein the scan control signal and the sensing control signal may have an off level in the initialization period and an on level in the sensing input period.

In an embodiment, the display panel may further include a sensing capacitor including a first electrode connected to the sensing line and a second electrode connected to a reference power source, wherein the data driver may include a first switch connecting a power line to which an initialization voltage is applied to the sensing line.

In an embodiment, the first sensing voltage and the second sensing voltage may be voltages charged in the sensing capacitor.

In an embodiment, the first sub-pixel may display a first color, the display panel may further include a second sub-pixel displaying a second color and a third sub-pixel displaying a third color, and the driving controller may independently sense each of characteristics of the first to third sub-pixels.

In an embodiment, when sensing a characteristic of one of the first to third sub-pixels, the data driver may provide a reference voltage to the one of the first to third sub-pixels and provide a standby voltage to the remaining ones of the first to third sub-pixels except for the one of the first to third sub-pixels.

In an embodiment, each of the first to third sub-pixels may include a third transistor connected to the sensing line and a light-emitting element, wherein the third transistor of at least one of the first to third sub-pixels may overlap a first electrode of the light emitting element of at least one of the first to third sub-pixels in a plan view.

Another embodiment provides a driving method of a display device, including providing a sensing control signal having a first voltage to a first sub-pixel, receiving a first sensing voltage from the first sub-pixel through a sensing line, providing the sensing control signal having a second voltage different from the first voltage to the first sub-pixel, receiving a second sensing voltage from the first sub-pixel through the sensing line and sensing a characteristic of the first sub-pixel based on the first sensing voltage and the second sensing voltage.

In an embodiment, the characteristic of the first sub-pixel may be sensed by a difference between the first sensing voltage and the second sensing voltage.

In an embodiment, the driving method of the display device may further include compensating for a data voltage applied to the sub-pixel based on the characteristic of the first sub-pixel.

In an embodiment, the data voltage may decrease as the difference between the first sensing voltage and the second sensing voltage increases.

In an embodiment, the driving method of the display device may further include providing a reference voltage to the first sub-pixel through a data line.

In an embodiment, the driving method of the display device may further include sensing a characteristic of a second sub-pixel displaying a second color, wherein the first sub-pixel may display a first color, and the characteristic of the second sub-pixel may be independently sensed from the characteristic of the first sub-pixel.

In an embodiment, when sensing the characteristics of the second sub-pixel, a standby voltage may be provided to the first sub-pixel and a reference voltage may be provided to the second sub-pixel.

Another embodiment provides an electronic device including a display device which have a display panel. The display panel includes a first sub pixel, a gate driver that provides a sensing control signal having a first voltage applied to the first sub-pixel during a first sensing period and a sensing control signal having a second voltage different from the first voltage applied to the first sub-pixel during a second sensing period, a data driver that receives a first sensing voltage from the first sub-pixel through a sensing line in the first sensing period and a second sensing voltage from the first sub-pixel through the sensing line in the second sensing period, and a driving controller that controls the data driver and the gate driver and senses a characteristic of the first sub-pixel based on the first sensing voltage and the second sensing voltage.

In an embodiment, the display device may sense the characteristics of the switching transistor by sensing the characteristics of the sub-pixel based on the first sensing voltage that is generated through the sensing control signal having the first voltage, and the second sensing voltage generated through the sensing control signal having the second voltage. Accordingly, a luminance deviation between sub-pixels according to the characteristics of the switching transistor may be compensated.

In an embodiment, the display device may dispose a switching transistor by compensating for a luminance deviation between sub-pixels according to the characteristics of the switching transistor.

However, the effects of the invention are not limited to the above-described effects and may be variously extended without departing from the spirit and scope of the invention.

DETAILED DESCRIPTION

Figure 1:
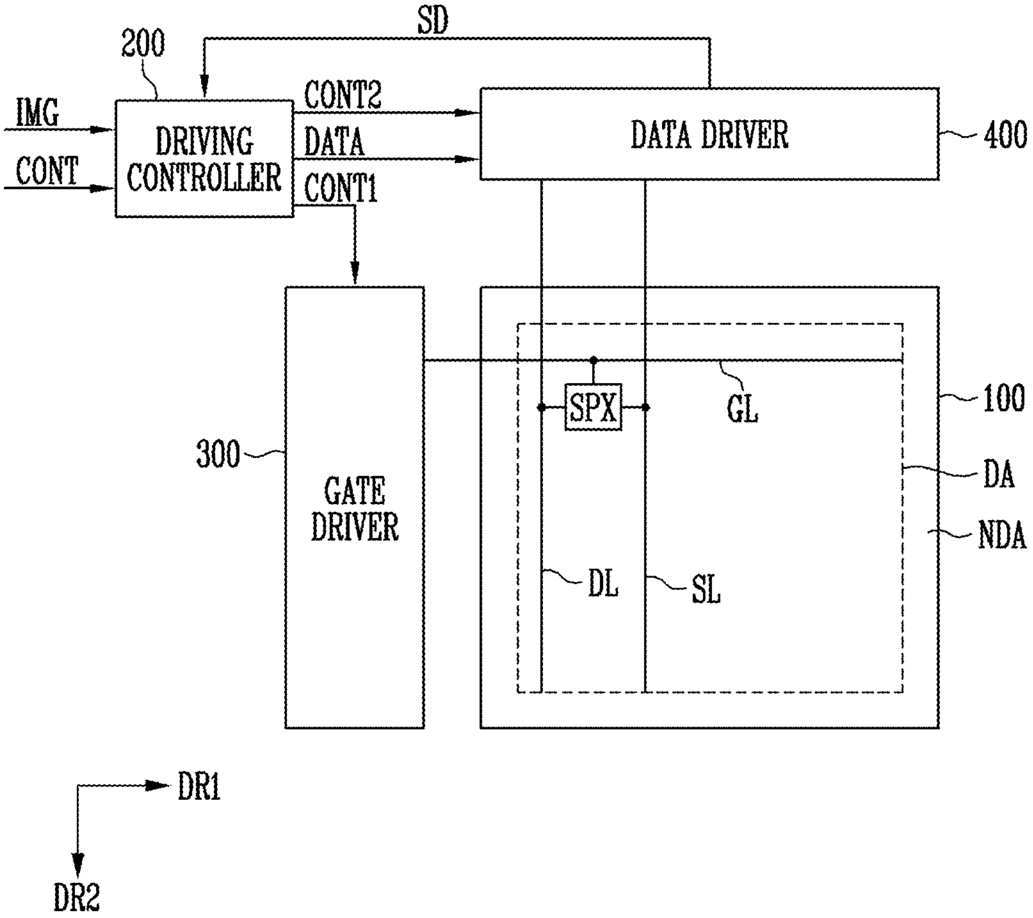
FIG. 1 illustrates a block diagram of a display device, according to an embodiment.

Hereinafter, example embodiments of the invention will be described in detail with reference to the accompanying drawings. The following description is intended to provide only a sufficient disclosure to enable the understanding of the operation of the invention, and any other disclosure is omitted to avoid obscuring the scope of the invention. In addition, the invention may be embodied in different forms and is not limited to the embodiments set forth herein. The embodiments described herein are provided for the purpose of describing the invention in sufficient detail for those skilled in the art to easily practice it.

Throughout the specification, when it is described that an element is "connected" to another element, this includes not only being "directly connected", but also being "indirectly connected" with another device disposed in between. The terms used herein are for the purpose of describing specific embodiments and are not intended to limit the scope of the invention. Throughout the specification, unless explicitly described to the contrary, the word "comprise" and variations such as "comprises" or "comprising" will be understood to imply the inclusion of stated elements but not the exclusion of any other elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various constituent elements, these constituent elements should not be limited by these terms. These terms are used to distinguish one constituent element from another. Thus, a first constituent element discussed below could be termed a second constituent element without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or at other orientations), and, as such, the spatially relative descriptors used herein interpreted accordingly.

Various embodiments are described herein with reference to sectional illustrations that are schematic illustrations of idealized embodiments. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Hereinafter, the invention will be described in detail with reference to the accompanying drawings.

FIG. 1 illustrates a block diagram of a display device, according to an embodiment.

In an embodiment and referring to FIG. 1, the display device may include a display panel 100, a driving controller 200, a gate driver 300, and a data driver 400. In an embodiment, the driving controller 200 and data driver 400 may be integrated on a single chip.

In an embodiment, the display panel 100 may include a display area DA displaying an image and a non-display area NDA disposed adjacent to the display area DA. In an embodiment, the gate driver 300 may be mounted in the non-display area NDA.

The display panel 100 may include a plurality of gate lines GL, a plurality of data lines DL, a plurality of sensing lines SL, and a plurality of sub-pixels SPX electrically connected to the plurality of gate lines GL, the plurality of data lines DL, and the plurality of sensing lines SL. The gate lines GL may extend in a first direction DR1, and the data lines DL and the sensing lines SL may extend in a second direction DR2 intersecting the first direction DR1.

In an embodiment, the driving controller 200 may receive input image data IMG and an input control signal CONT from a main processor (for example, a graphic processing unit (GPU) and the like). For example, the input image data IMG may include red image data, green image data, and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, and a data signal DATA based on the input image data IMG and the input control signal CONT.

The driving controller 200 may generate the first control signal CONT1 for controlling the operation of the gate driver 300 based on the input control signal CONT to output it to the gate driver 300. The first control signal CONT1 may include a vertical start signal and gate clock signal.

The driving controller 200 may generate the second control signal CONT2 for controlling the operation of the data driver 400 based on the input control signal CONT to output it to the data driver 400. The second control signal CONT2 may include a horizontal start signal and a load signal.

The driving controller 200 may receive the input image data IMG and the input control signal CONT to generate the data signal DATA, where the driving controller 200 may output the data signal DATA to the data driver 400.

In an embodiment, the gate driver 300 may generate gate signals (for example, a scan control signal SC (see FIG. 4) and a sensing control signal SS (see FIG. 4)) for driving the gate lines GL in response to the first control signal CONT1 inputted from the driving controller 200. The gate driver 300 may output the gate signals to the gate lines GL. For example, the gate driver 300 may sequentially output the gate signals to the gate lines GL.

In an embodiment, the data driver 400 may receive the second control signal CONT2 and the data signal DATA from the driving controller 200 and may generate data voltages obtained by converting the data signal DATA into an analog voltage. The data driver 400 may output the data voltages to the data line DL.

The data driver 400 may further receive a sensing voltage VSEN (see FIG. 8) from the sensing line SL to generate sensing data SD, where the sensing data SD may include the characteristics of the sub-pixel SPX. For example, the sensing data SD may include the current transmission capability (hereinafter, referred to as a 'first characteristic') of a third transistor T3 (see FIG. 4) of the sub-pixel SPX. For another example, the sensing data SD may further include a threshold voltage and/or mobility (hereinafter, referred to as a 'second characteristic') of a driving transistor (for example, a first transistor T1 (see FIG. 4)) of the sub-pixel SPX.

In an embodiment, the driving controller 200 may sense the characteristics of the sub-pixel SPX through the sensing data SD, where the driving controller 200 may receive the sensing data SD and compensate for the input image data IMG. The driving controller 200 may generate the data signal DATA based on the compensated input image data. That is, the driving controller 200 may compensate for the data voltage by compensating the input image data IMG.

Figure 2:
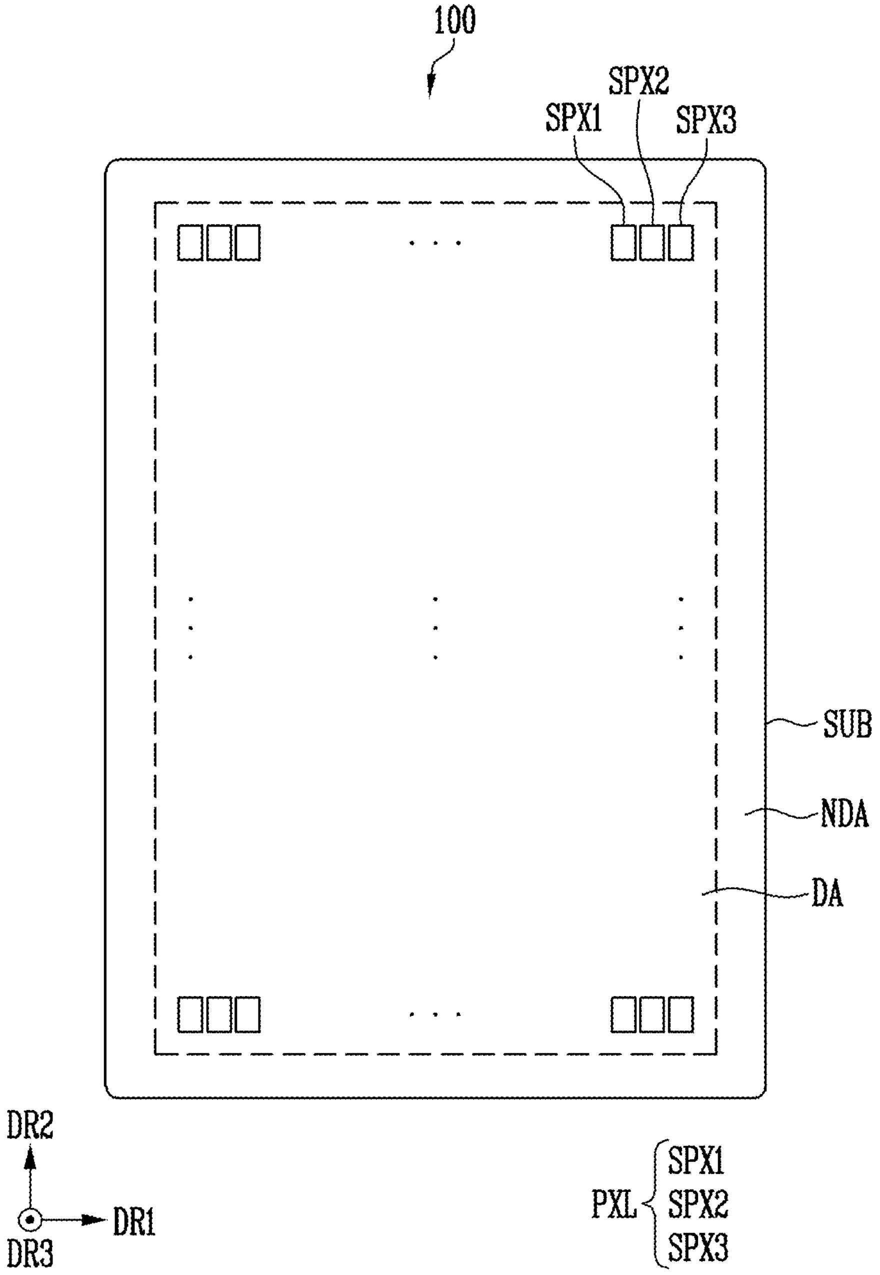
FIG. 2 illustrates a schematic top plan view of the display panel of FIG. 1, according to an embodiment.

FIG. 2 illustrates a schematic top plan view of a display panel of FIG. 1, according to an embodiment.

In an embodiment and referring to FIG. 2, the display panel 100 may be provided in various shapes, for example, the display panel 100 may be provided in a rectangular plate shape having two pairs of sides which are directed parallel to each other, but is not limited thereto. When the display panel 100 is provided in the rectangular plate shape, one pair of sides may be longer than the other pair of sides.

In an embodiment, at least a portion of the display panel 100 may have flexibility, and the display panel DP may be folded at the portion having the flexibility, but the invention is not limited thereto.

In an embodiment, the display panel 100 may display an image. A self-emission display panel such as an organic light emitting display panel (OLED panel) using an organic light emitting diode as a light emitting element, a micro-LED or nano-LED display panel using an ultra small light emitting diode as a light emitting element, or a quantum dot organic light emitting display panel (QD OLED panel) using a quantum dot and an organic light emitting diode may be used. In addition, a non-light emitting display panel such as a liquid crystal display panel (LCD panel), an electro-phoretic display panel (EPD panel), and an electro-wetting display panel (EWD panel) may be used. When a non-light emitting display panel is used as the display panel 100, the display panel 100 may include a backlight unit that supplies light to the display panel 100.

In an embodiment, the display panel 100 may include a substrate SUB and pixels PXL provided on the substrate SUB.

In an embodiment, the substrate SUB may include a transparent insulating material to transmit light, where the substrate SUB may be a rigid substrate or a flexible substrate. For example, the rigid substrate may be one of a glass substrate, a quartz substrate, a glass ceramic substrate, and a crystalline glass substrate.

In an embodiment, the flexible substrate may be one of a film substrate and a plastic substrate, which include a polymer organic material. For example, the flexible substrate may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

In an embodiment, the display panel 100 may have various shapes. For example, the display panel 100 may be provided in a rectangular shape, but is not limited thereto. For example, the display panel 100 may have a circular or elliptical shape. In addition, the display panel 100 may include an angled corner and/or curved line corner. For convenience, FIG. 2 illustrates that the display panel 100 has a rectangular plate shape. In addition, in FIG. 2, an extending direction of a short side (for example, horizontal direction) of the display panel 100 is indicated as the first direction DR1, and an extending direction of a long side (for example, vertical direction) is indicated as the second direction DR2.

In an embodiment, the substrate SUB (and the display panel 100) may include a display area DA for displaying an image and a non-display area disposed adjacent to and surrounding the display area DA. The substrate SUB may include the display area DA including pixel areas in which respective pixels PXL are disposed, and the non-display area NDA disposed around the display area DA (or disposed adjacent to the display area DA).

In an embodiment, the non-display area NDA may be disposed to be adjacent to the display area DA and may be provided in at least one side of the display area DA. For example, the non-display area NDA may surround a circumference (or edge) of the display area DA. In an example, the non-display area NDA may be a bezel area of the display panel 100.

In an embodiment, the pixel PXL may be disposed in the display area DA on the substrate SUB. The non-display area NDA may be disposed around the display area DA. The non-display area NDA may have a structure for protecting components included in the pixel PXL disposed in the display area DA, but is not limited thereto. For example, the non-display area NDA may be provided with a wire portion connected to each pixel PXL and a driver connected to the wire portion and driving the pixel PXL.

The pixel PXL may include a plurality of sub-pixels SPX1 to SPX3. For example, the pixel PXL may include a first sub-pixel SPX1, a second sub-pixel SPX2, and a third sub-pixel SPX3. The first sub-pixel SPX1, the second sub-pixel SPX2, and the third sub-pixel SPX3 may be sequentially disposed in a first direction DR1. However, the invention is not limited to the disposition of sub-pixels SPX1 to SPX3.

In an embodiment, the sub-pixels SPX1 to SPX3 may emit light in different colors. For example, the first sub-pixel SPX1 may be a red sub-pixel emitting light in red, the second sub-pixel SPX2 may be a green sub-pixel emitting light in green, and the third sub-pixel SPX3 may be a blue sub-pixel emitting light in blue. However, the color, type, and/or number of the sub-pixels configuring the pixel PXL are not particularly limited, and for example, the color of light emitted by each of the sub-pixels SPX1 to SPX3 may be variously changed. Hereinafter, the sub-pixels SPX1 to SPX3 are collectively referred to as sub-pixels SPX (see FIG. 4).

Figure 3:
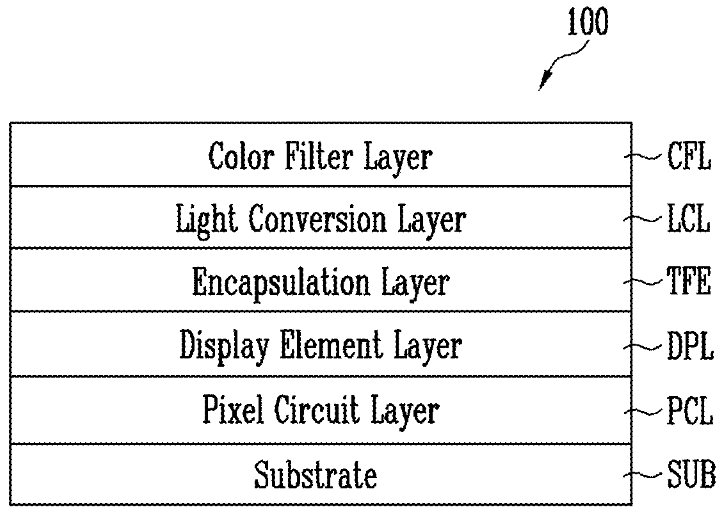
FIG. 3 illustrates a schematic cross-sectional view of the display panel of FIG. 2, according to an embodiment.

FIG. 3 illustrates a schematic cross-sectional view of a display panel of FIG. 2, according to an embodiment.

In an embodiment and referring to FIG. 3, the display panel 100 may include a substrate SUB, a pixel circuit layer PCL, a display element layer DPL, an encapsulation layer TFE, a light conversion layer LCL, and a color filter layer CFL. In an embodiment, the substrate SUB, the pixel circuit layer PCL, the display element layer DPL, the encapsulation layer TFE, the light conversion layer LCL, and the color filter layer CFL may be sequentially stacked in the third direction DR3.

In an embodiment, the pixel circuit layer PCL is provided on the substrate SUB, and may include a plurality of transistors and signal wires connected to the transistors. For example, each transistor may have a structure in which a semiconductor pattern, a gate electrode, a source electrode, and a drain electrode are sequentially stacked with an insulating layer interposed therebetween. The semiconductor pattern may include an amorphous silicon, a poly silicon, a low temperature poly silicon, an organic semiconductor, and/or an oxide semiconductor. The gate electrode, the source electrode, and the drain electrode may include one of aluminum (Al), copper (Cu), titanium (Ti), and molybdenum (Mo), but is not limited thereto. In addition, the pixel circuit layer PCL may include at least one or more insulating layers.

In an embodiment, the display element layer DPL may be disposed on the pixel circuit layer PCL and may include a light emitting element LD (see FIG. 4) that emits light. The light emitting element may be, for example, an organic light emitting diode, but is not limited thereto. In an embodiment, the light emitting element may be an inorganic light emitting element including an inorganic light emitting material or a light emitting element that emits light by changing a wavelength of light emitted by using a quantum dot.

In an embodiment, the encapsulation layer TFE may be disposed on the display element layer DPL and may be an encapsulation substrate or a multi-layered encapsulation film. When the encapsulation layer TFE is in a form of the encapsulation film, it may include an inorganic film and/or an organic film. For example, the encapsulation layer TFE may have a structure in which an inorganic film, an organic film, and an inorganic film are sequentially stacked. The encapsulation layer TFE may prevent external air and moisture from penetrating into the display element layer DPL and the pixel circuit layer PCL.

In an embodiment, the light conversion layer LCL may be disposed on the encapsulation layer TFE and may include elements for converting light emitted from the display element layer DPL into light of a specific color and increasing light emitting efficiency. In an embodiment, the light conversion layer LCL may include a color conversion layer and a low refractive layer.

In an embodiment, the color filter layer CFL may be disposed on the light conversion layer LCL and may selectively transmit light passing through the light conversion layer LCL (or the display element layer DPL). The color filter layer CFL may include first to third color filters.

Figure 4:
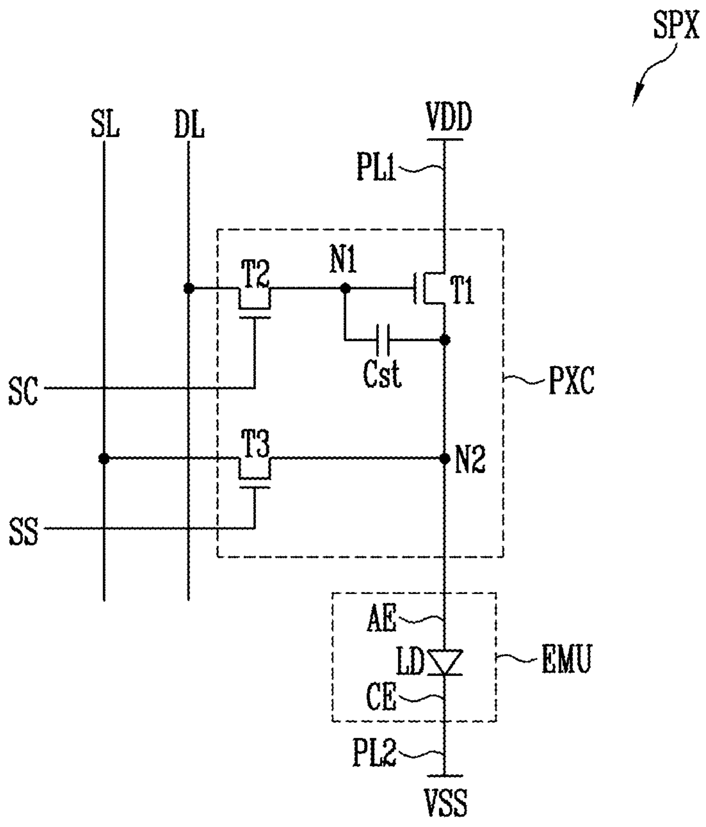
FIG. 4 illustrates a circuit diagram of an example of the sub-pixel of FIG. 1, according to an embodiment.

FIG. 4 illustrates a circuit diagram of an example of the sub-pixel of FIG. 1, according to an embodiment.

In an embodiment, the sub-pixel SPX shown in FIG. 4 may be one of the sub-pixels SPX1 to SPX3 shown in FIG. 2, and the sub-pixels SPX1 to SPX3 shown in FIG. 2 may be configured to be substantially the same as or similar to each other.

In an embodiment and referring to FIG. 1 to FIG. 4, the sub-pixel SPX may include a light emitting portion EMU that generates light with luminance corresponding to a data voltage. In addition, the sub-pixel SPX may further include a pixel circuit PXC for driving the light emitting portion EMU.

In an embodiment, the light emitting portion EMU may include a light emitting element LD connected between a first power line PL1 receiving a voltage of a first driving power source VDD (or a first power source) and a second power line PL2 receiving a voltage of a second driving power source VSS (or a second power source). For example, the light emitting portion EMU may include the light emitting element LD that includes a first electrode AE connected to the first driving power source VDD via the pixel circuit PXC and the first power line PL1 and a second electrode CE connected to the second driving power source VSS via the second power line PL2. The first electrode AE may be an anode electrode, and the second electrode CE may be a cathode electrode. The first driving power source VDD and the second driving power source VSS may have different potentials. In this case, a potential difference between the driving power sources VDD and VSS may be set to be equal to or higher than a threshold voltage of the light emitting element LD during a light emitting period of the sub-pixel SPX.

In an embodiment, the above-described pixel circuit PXC may include a driving transistor (for example, first transistor T1), a switching transistor (for example, second and third transistors T2 and T3), and a storage capacitor Cst.

In an embodiment, the first transistor T1 is a driving transistor for controlling a driving current applied to the light emitting element LD, and may be electrically connected between the first driving power source VDD and the light emitting element LD. For example, the first transistor T1 may include a control electrode connected to a first node N1, a first electrode connected to the first power line PL1, and a second electrode connected to a second node N2. The first transistor T1 may control an amount of the driving current applied to the light emitting element LD from the first driving power source VDD through the second node N2 according to a voltage applied to the first node N1.

In an embodiment, the second transistor T2 may be electrically connected between the data line DL and the first node N1 as a switching transistor. For example, the second transistor T2 may include a control electrode receiving the scan control signal SC, a first electrode connected to the data line DL, and a second electrode connected to the first node N1.

The second transistor T2 may be turned on when a scan control signal SC of an on voltage (for example, a high level voltage) is supplied to electrically connect the data line DL to the first node N1. The second transistor T2 may transmit a signal of the data line DL to the control electrode of the first transistor T1.

Figure 8:
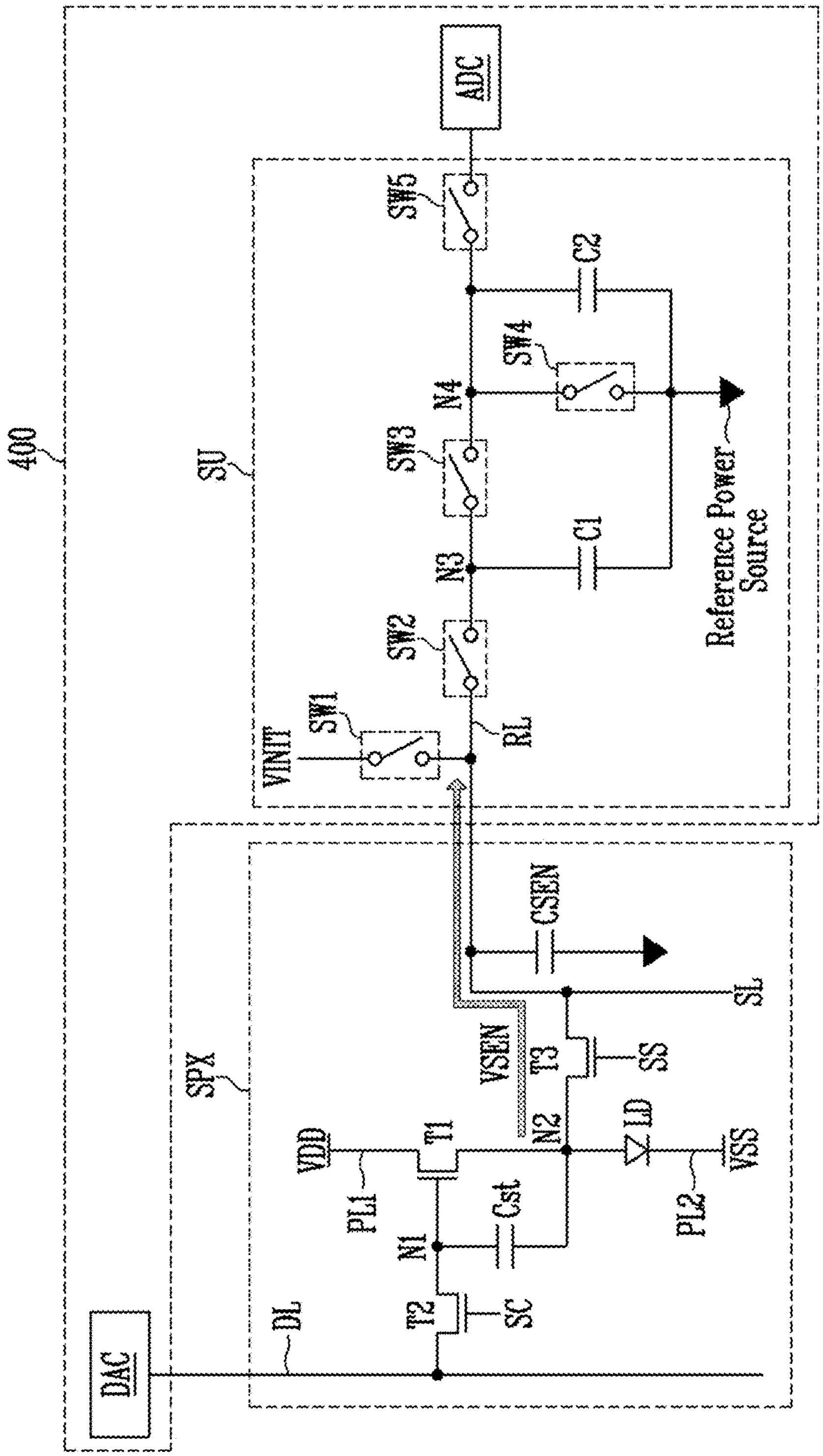
FIG. 8 illustrates a circuit diagram of an example of a sub-pixel and a data driver of FIG. 1, according to an embodiment.

In an embodiment, the third transistor T3 as a switching transistor electrically connects the first transistor T1 to the sensing line SL, so that the data driver 400 (see FIG. 3) may obtain a sensing voltage VSEN (see FIG. 8) through the sensing line SL, and characteristics of the sub-pixels SPX including a threshold voltage of the first transistor T1 and the like may be sensed by using the sensing voltage VSEN (see FIG. 8). Information on the characteristic of the sub-pixel SPX may be used to compensate for the input image data IMG (see FIG. 1) so that a characteristic deviation between the sub-pixels SPX may be compensated. For example, the third transistor T3 may include a control electrode receiving the sensing control signal SS, a first electrode connected to the second node N2, and a second electrode connected to the sensing line SL.

In an embodiment, the storage capacitor Cst may include a first electrode connected to the first node N1 and a second electrode connected to the second node N2 and may charge a data voltage supplied to the first node N1 during one frame period. Accordingly, the storage capacitor Cst may store a voltage corresponding to a voltage difference between the voltage of the control electrode of the first transistor T1 and the voltage of the second node N2.

Referring to FIG. 4, an embodiment in which all of the transistors T1 to T3 are N-type transistors is disclosed, but the invention is not limited thereto. For example, at least one of the transistors T1 to T3 described above may be changed to a P-type transistor. The structure of the pixel circuit PXC may be variously changed.

Figure 5:
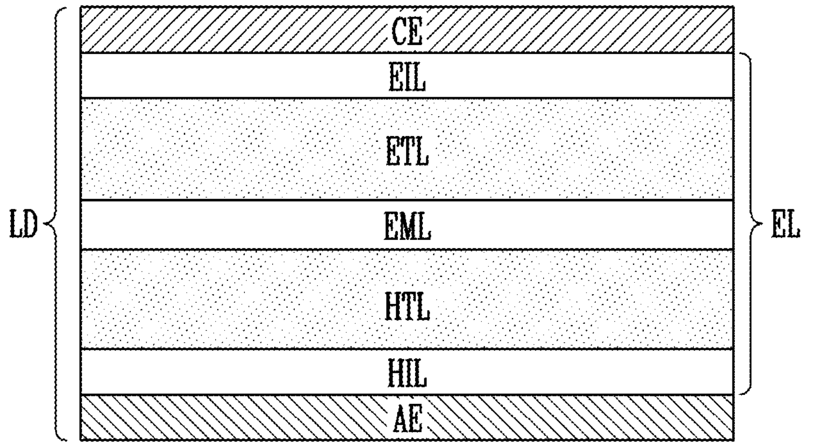
FIG. 5 illustrates a cross-sectional view of an example of a light emitting element of FIG. 4, according to an embodiment.
Figure 6:
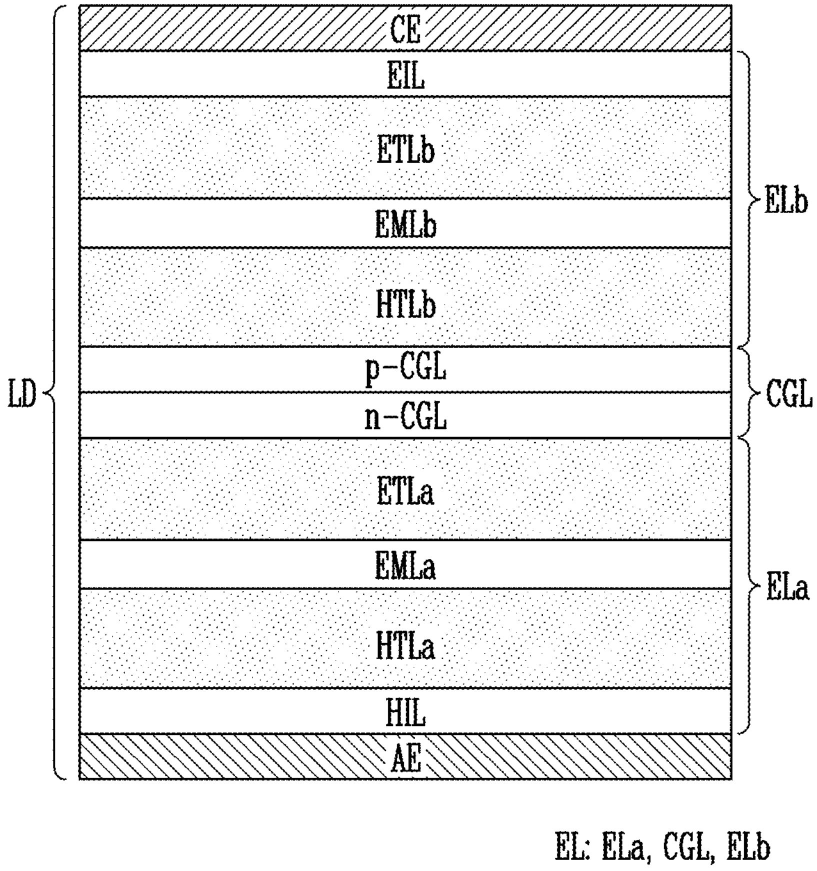
FIG. 6 illustrates a cross-sectional view of another example of a light emitting element of FIG. 4, according to an embodiment.

FIG. 5 illustrates a cross-sectional view of an example of a light emitting element of FIG. 4, according to an embodiment, and FIG. 6 illustrates a cross-sectional view of another example of a light emitting element of FIG. 4, according to an embodiment.

In an embodiment and referring to FIG. 5, the light emitting device LD may include a first electrode AE, an organic light emitting portion EL, and a second electrode CE that are sequentially stacked.

In an embodiment, the first electrode AE may be patterned to correspond to the sub-pixels SPX1 to SPX3 (see FIG. 4).

In an embodiment, the organic light emitting portion EL may be provided on the first electrode AE and may have a multi-layered thin film structure including a plurality of light generation layers. The organic light emitting portion EL may include a hole injection layer HIL, a hole transport layer HTL, a light emitting layer EML, an electron transport layer ETL, and an electron injection layer EIL that are sequentially stacked.

In an embodiment, the hole injection layer HIL may be an organic layer that is disposed between the first electrode AE and the hole transport layer HTL to facilitate hole injection from the first electrode AE to the light emitting layer EML.

The hole transport layer HTL is disposed between the hole injection layer HIL and the first electrode AE and may serve to receive holes from the first electrode AE to transport the holes to the light emitting layer EML.

In an embodiment, the electron injection layer EIL may be disposed between the electron transport layer ETL and the second electrode CE. The electron transport layer ETL is disposed on the light emitting layer EML and may serve to receive electrons from the second electrode CE to transport the electrons to the light emitting layer EML.

In an embodiment, the light emitting layer EML is an area in which light is generated by a combination of electrons and holes which are supplied from the first electrode AE and the second electrode CE. The light emitting layer EML may include an organic light emitting material such as a high molecular weight organic material or a low molecular weight organic material that emits light of a predetermined color. For example, the light emitting layer EML may be made of an organic material that emits blue light. However, the invention is not limited thereto. In an embodiment, the light emitting layer EML may be made of an organic material that emits red or green light, or may be made of an inorganic material or quantum dot.

In an embodiment, the second electrode CE may be integrally provided and may be disposed on the organic light emitting portion EL. The second electrode CE may be integrally formed in the light emitting elements.

In an embodiment and referring to FIG. 6, the light emitting element LD may include a first electrode AE, an organic light emitting portion EL, and a second electrode CE.

In an embodiment, the organic light emitting portion EL may include a plurality of light generation layers. In an example, the organic light emitting portion EL may include the first organic light emitting portion ELa, a charge generation layer CGL, and the second organic light emitting portion ELb. The first electrode AE, the first organic light emitting portion ELa, the charge generation layer CGL, the second organic light emitting portion ELb, and the second electrode CE may be sequentially stacked.

In an embodiment, the first organic light emitting portion ELa may be provided to have a structure in which a hole injection layer HIL, a first hole transport layer HTLa, a first organic light emitting layer EMLa, and a first electron transport layer ETLa are sequentially stacked. The second organic light emitting portion ELb may be provided to have a structure in which a second hole transport layer HTLb, a second organic light emitting layer EMLb, a second electron transport layer ETLa and the electron injection layer EIL are sequentially stacked.

In an embodiment, a buffer layer (not shown) may be disposed on the first organic light emitting layer EMLa and the second organic light emitting layer EMLb and may include a compound with electron transport properties.

In an embodiment, the charge generation layer CGL may serve to supply charges to the first organic light emitting portion ELa and the second organic light emitting portion ELb. The charge generation layer CGL may include an n-type electron generation layer n-CGL for supplying charges to the first organic light emitting portion ELa and a p-type charge generation layer p-CGL for supplying holes to the second organic light emitting portion ELb. In this case, the n-type charge generation layer n-CGL may include a metal material as a dopant.

In and embodiment and referring to FIG. 6, the two organic light emitting portions ELa and ELb of the light emitting device LD are illustrated as being stacked, but the invention is not limited thereto. For example, three or four or more organic light emitting portions may be stacked in the light emitting element LD.

Figure 7:
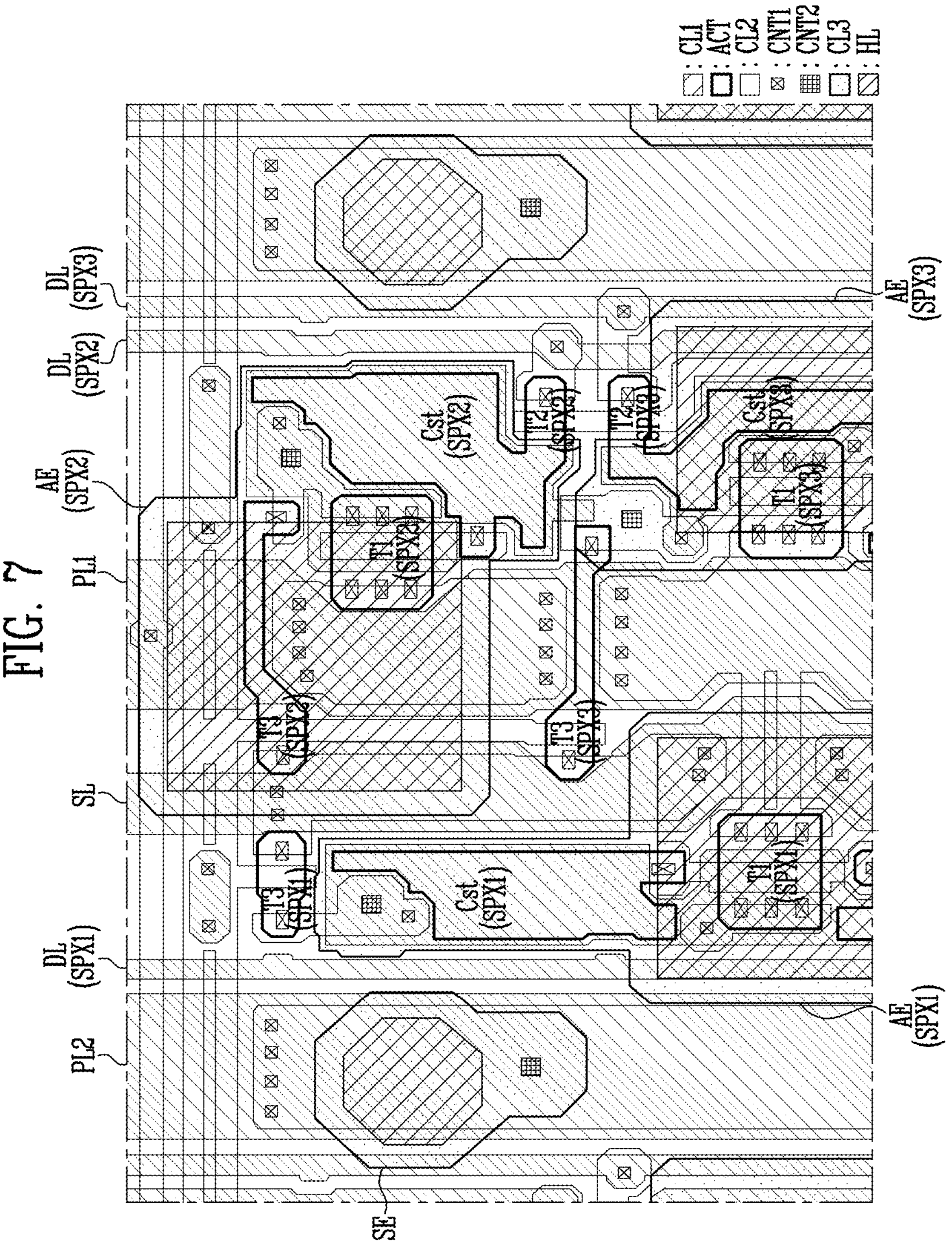
FIG. 7 illustrates a design diagram of an example of a portion of the display panel of FIG. 2, according to an embodiment.

FIG. 7 illustrates a design diagram of an example of a portion of the display panel of FIG. 2, according to an embodiment.

Referring to FIG. 7, components other than first to third electrode layers CL1 to CL3, respectively, an active layer ACT, and first and second contact holes CNT1 and CNT2, respectively, are omitted.

In an embodiment and referring to FIG. 4 and FIG. 7, the display panel 100 may include the electrode layers CL1 to CL3, the active layer ACT, and the contact holes CNT1 and CNT2.

In an embodiment, the first electrode layer CL1 may form the data line DL, the first and second power lines PL1 and PL2, respectively, the sensing line SL, and the second electrode of the storage capacitor Cst. For example, the first electrode layer CL1 may include at least one of copper (Cu), molybdenum (Mo), tungsten (W), aluminum neodymium (AlNd), titanium (Ti), aluminum (Al), and silver (Ag).

In an embodiment, it is illustrated that the sub-pixels SPX1 to SPX3 share one sensing line SL, but the invention is not limited thereto. For example, each of the sub-pixels SPX1 to SPX3 may be connected to a different sensing line SL.

In an embodiment, the active layer ACT may be formed on the first electrode layer CL1 and may include a channel region of each of the transistors T1 to T3. The active layer ACT may include a semiconductor pattern made of an amorphous silicon, polysilicon, low-temperature polysilicon, an oxide semiconductor, or an organic semiconductor. For example, the channel area, which is a semiconductor pattern that is not doped with impurities, may be an intrinsic semiconductor. A portion of the active layer ACT connected to the second electrode layer CL2 may be a semiconductor pattern doped with impurities.

In an embodiment, the active layer ACT may form the first electrode of the storage capacitor Cst. For example, a portion of the active layer ACT forming the first electrode of the storage capacitor Cst may be a semiconductor pattern doped with impurities.

In an embodiment, the second electrode layer CL2 may be formed on the active layer ACT, where the second electrode layer CL2 may form the first electrode, the second electrode, and the control electrode or the gate line of each of the transistors T1 to T3. The second electrode layer CL2 may be connected to the first electrode layer CL1 through the first contact hole CNT1. For example, the second electrode layer CL2 may include at least one of copper (Cu), molybdenum (Mo), tungsten (W), aluminum neodymium (AlNd), titanium (Ti), aluminum (Al), and silver (Ag).

The third electrode layer CL3 may be formed on the second electrode layer CL2. The third electrode layer CL3 may form the first electrode AE and the auxiliary electrode SE of the light emitting element LD. The third electrode layer CL3 may be connected to the second electrode layer CL2 through the second contact hole CNT2. For example, the third electrode layer CL3 may include at least one of copper (Cu), molybdenum (Mo), tungsten (W), aluminum neodymium (AlNd), titanium (Ti), aluminum (Al), and silver (Ag).

In an embodiment, the auxiliary electrode SE may be connected to the second electrode CE of the light emitting element LD, and a portion of the second electrode layer CL2 connected to the auxiliary electrode SE may transmit the second driving power source VSS to the auxiliary electrode SE.

In an embodiment, t hole HL defined by a pixel defining film may be formed on the third electrode layer CL3. The organic light emitting portion EL (see FIG. 5) may be formed in the hole HL on the anode electrode AE and the second electrode CE may be formed in the hole HL on the auxiliary electrode SE.

FIG. 8 illustrates a circuit diagram of an example of the sub-pixel and the data driver of FIG. 1, according to an embodiment.

The sub-pixel SPX shown in FIG. 8 is the same as the sub-pixel SPX described with reference to FIG. 4, so redundant descriptions of the sub-pixels SPX will be omitted.

In an embodiment and referring to FIG. 8, the sub-pixel SPX may include a sensing capacitor CSEN including a first electrode connected to the sensing line SL and a second electrode connected to the reference power source. Here, the reference power source may have a ground voltage, but is not limited thereto.

In an embodiment, it is illustrated that the sensing capacitor CSEN is formed in the sub-pixel SPX, but the invention is not limited thereto. For example, the sensing capacitor CSEN may be formed in the data driver 400.

In an embodiment, the data driver 400 may include a digital-to-analog converter DAC, where the digital-to-analog converter DAC may generate a data voltage corresponding to a data value included in the data signal DATA (see FIG. 1). For example, in a display period in which an image is displayed, the digital-to-analog converter DAC may select one of the gamma voltages based on the data value and output it as a data voltage. Meanwhile, the data driver 400 may further include an output buffer (not shown) and may provide a voltage corresponding to the data value to the data line DL through the output buffer.

In an embodiment, the digital-to-analog converter DAC may selectively provide a reference voltage VREF (see FIG. 9) or a standby voltage STAV (see FIG. 9) to the data line DL in first to third color sensing periods CS1 to CS3, respectively, (see FIG. 9) to be described later.

In an embodiment, the data driver 400 may further include a sensing unit SU and an analog-to-digital converter ADC connected to the sensing line RL.

In an embodiment, the sensing unit SU may include a first switch SW1, a second switch SW2, a first capacitor C1, a third switch SW3, a fourth switch SW4, a second capacitor C2, and a fifth switch SW5.

In an embodiment, the first switch SW1 may be connected between the power line to which the initialization voltage VINIT is applied and the sensing line RL. Here, the initialization voltage VINIT may have a voltage level that is lower than a voltage capable of operating the light emitting element LD. When the first switch SW1 is turned on, the initialization voltage VINIT may be applied to the sensing line RL. Accordingly, the sensing capacitor CSEN may be initialized. When the third transistor T3 is turned on, the initialization voltage VINIT may be applied to the second node N2. Accordingly, even when the first transistor T1 is turned on, the light emitting element LD may not emit light.

In an embodiment, when the first switch SW1 is turned off and the third transistor T3 is turned on, the sensing capacitor CSEN may be charged by a sensing current provided through the second node N2. The driving controller 200 (see FIG. 1) may sense the characteristics of the sub-pixel SPX through a voltage (that is, the sensing voltage VSEN) that is charged in the sensing capacitor CSEN.

In an embodiment, the second switch SW2 may be connected between the sensing line RL and the third node N3. The first capacitor C1 may be connected between the third node N3 and the reference power source. While the second switch SW2 is turned on, the first capacitor C1 may sample the sensing voltage VSEN stored in the sensing capacitor CSEN.

In an embodiment, the third switch SW3 may be connected between the third node N3 and the fourth node N4, the fourth switch SW4 may be connected between the fourth node N4 and the reference power source, and the second capacitor C2 may be connected between the fourth node N4 and the reference power source. When the third switch SW3 is turned on and the first capacitor C1 and the second capacitor C2 share electric charges, the voltage of the fourth node N4 (and the voltage of the third node N3) may be changed. According to the operations of the third switch SW3 and the fourth switch SW4, the third switch SW3, the fourth switch SW4, and the second capacitor C2 may function as a buffer. Here, a gain of the buffer may be determined according to a capacitance ratio of the first capacitor C1 and the second capacitor C2. That is, the third switch SW3, the fourth switch SW4, and the second capacitor C2 may amplify the voltage of the third node N3.

In an embodiment, the fifth switch SW5 may be connected between the fourth node N4 and the analog-to-digital converter ADC, and may connect the fourth node N4 to the input terminal of the analog-to-digital converter ADC. In this case, the node voltage of the fourth node N4 may be applied to the analog-to-digital converter ADC.

Although not shown, in an embodiment, a capacitor connected between the input terminal of the analog-to-digital converter ADC and the reference power source to maintain the node voltage of the fourth node N4 provided to the analog-to-digital converter ADC, and an initialization circuit that initializes the input terminal (or, the capacitor) of the analog-to-digital converter ADC (for example, a capacitor initialization power source and a switch that connects it to the input terminal of the analog-to-digital converter ADC) may be further included.

In an embodiment, the analog-to-digital converter ADC may convert a voltage provided to the input terminal thereof into a data value (for example, a digital code). The digital data value may be provided to the driving controller 200 as sensing data SD.

In an embodiment and referring to FIG. 8, the sensing unit SU is shown as being configured to include the capacitors C1 and C2 and the switches SW1, SW2, SW3, SW4, and SW5, but this is an example, and the invention is not limited thereto. For example, in another embodiment, if the sensing unit SU may detect the voltage (or current corresponding thereto) of the second node N2 of the sub-pixel SPX, various circuits may be implemented as the sensing unit SU.

In an embodiment and referring to FIG. 7 and FIG. 8, the sensing voltage VSEN charged in the sensing capacitor CSEN may be a voltage subtracted by a voltage reduction amount according to the current transmission capability of the third transistor T3 from the voltage of the second node N2. That is, the current transmission capability of the third transistor T3 refers to the degree to which the voltage of the second node N2 is reduced when the voltage of the second node N2 passes through the third transistor T3 to be transmitted to the sensing capacitor CSEN.

In an embodiment, at least one third transistor T3 of the sub-pixels SPX1 to SPX3 may overlap the first electrode AE of at least one light emitting element LD of the sub-pixels SPX1 to SPX3 when viewed in a plan view.

For example, as shown in FIG. 7, the third transistor T3 of the second sub-pixel SPX2 may overlap the first electrode AE of the light emitting element LD in a plan view, and the third transistor T3 of the sub-pixels SPX1 and SPX3 may not overlap the first electrode AE of the light emitting element LD. In this case, the degree of light deterioration of the third transistor T3 of the second sub-pixel SPX2 and the degree of light deterioration of the third transistors T3 of the sub-pixels SPX1 and SPX3 may be different from each other. That is, the current transmission capability of the third transistor T3 of the second sub-pixel SPX2 and the current transmission capability of each of the third transistors T3 of the sub-pixels SPX1 and SPX3 may be different from each other. Accordingly, even though respective second characteristics of the sub-pixels SPX1 to SPX3 are the same, respective sensing voltages VSEN received by the sub-pixels SPX1 to SPX3 may be different from each other. That is, the sensing voltage VSEN may be distorted by a deviation of the first characteristic between the sub-pixels SPX. Accordingly, when the data voltage is compensated by sensing only the second characteristic without considering the first characteristic, luminance deviation may occur due to distortion of the sensing voltage VSEN between the sub-pixels SPX1 to SPX3.

The display device, according to the an embodiment, may compensate for a luminance deviation between the sub-pixels SPX according to the first characteristic by sensing the first characteristic. In addition, since compensation considering the first characteristic is performed, the third transistor T3 may be relatively freely disposed.

Figure 9:
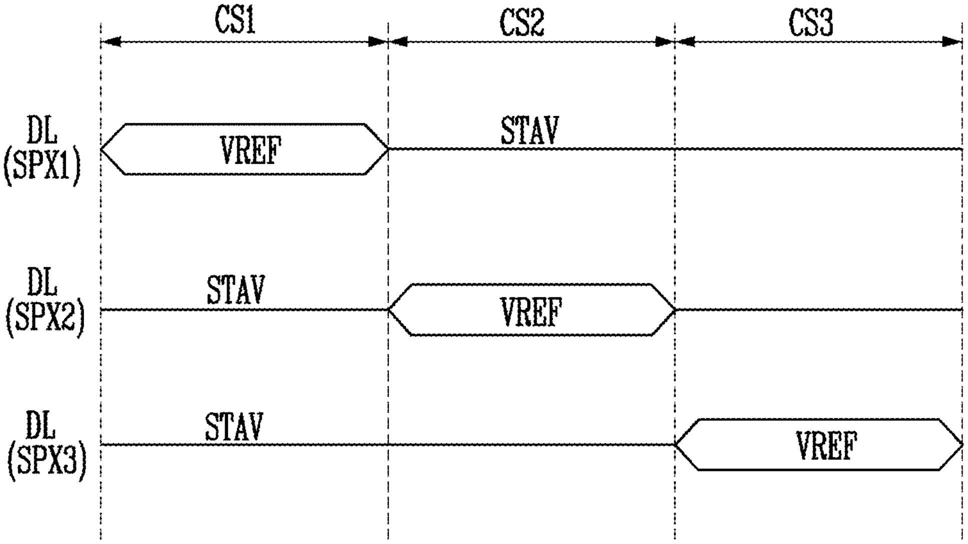
FIG. 9 illustrates a timing diagram of an example in which the display device of FIG. 1 operates during first to third color sensing periods, according to an embodiment.
Figure 10:
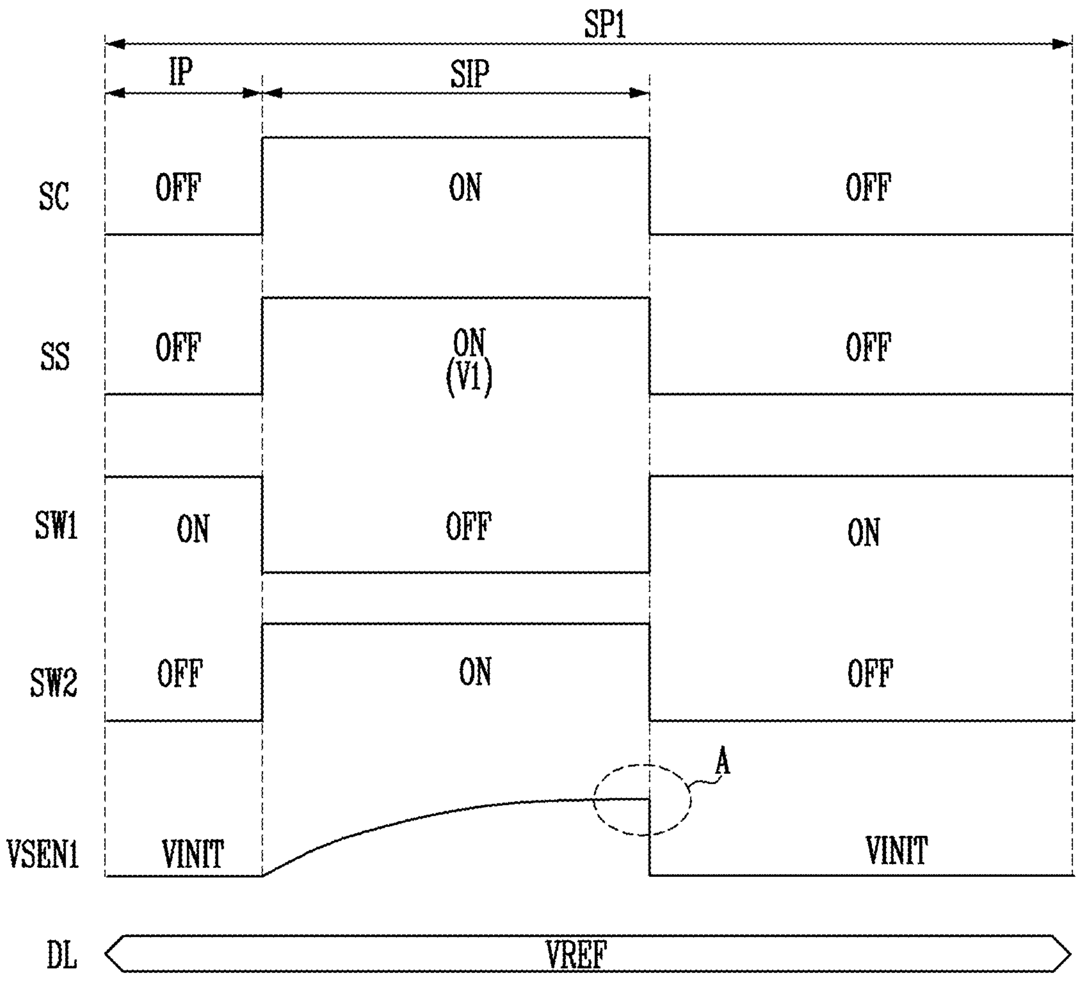
FIG. 10 illustrates a timing diagram of an example in which the display device of FIG. 1 operates during a first sensing period, according to an embodiment.
Figure 11:
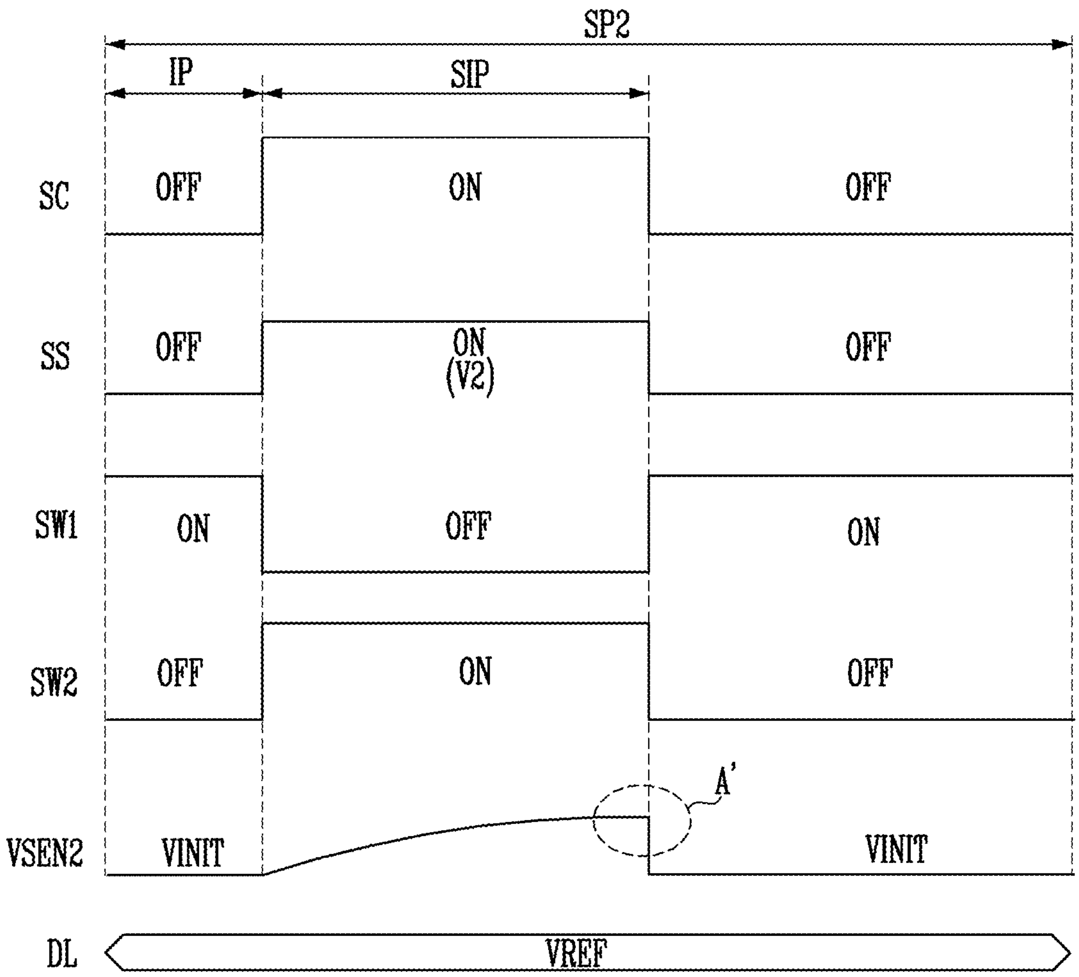
FIG. 11 illustrates a timing diagram of an example in which the display device of FIG. 1 operates during a second sensing period, according to an embodiment.
Figure 12:
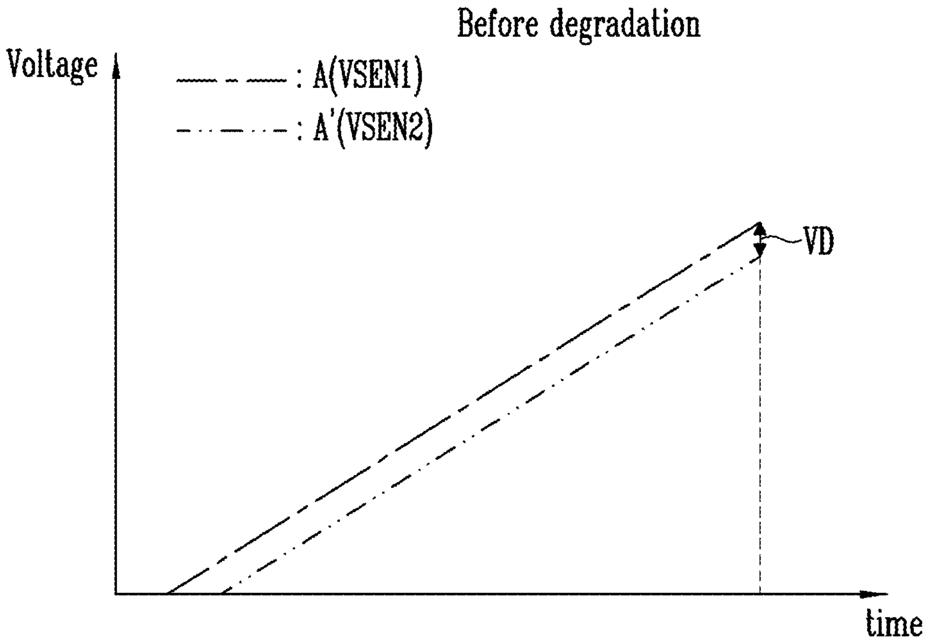
FIG. 12 illustrates a graph of area A of FIG. 10 and area A' of FIG. 11 before a third transistor is photo-degraded, according to an embodiment.
Figure 13:
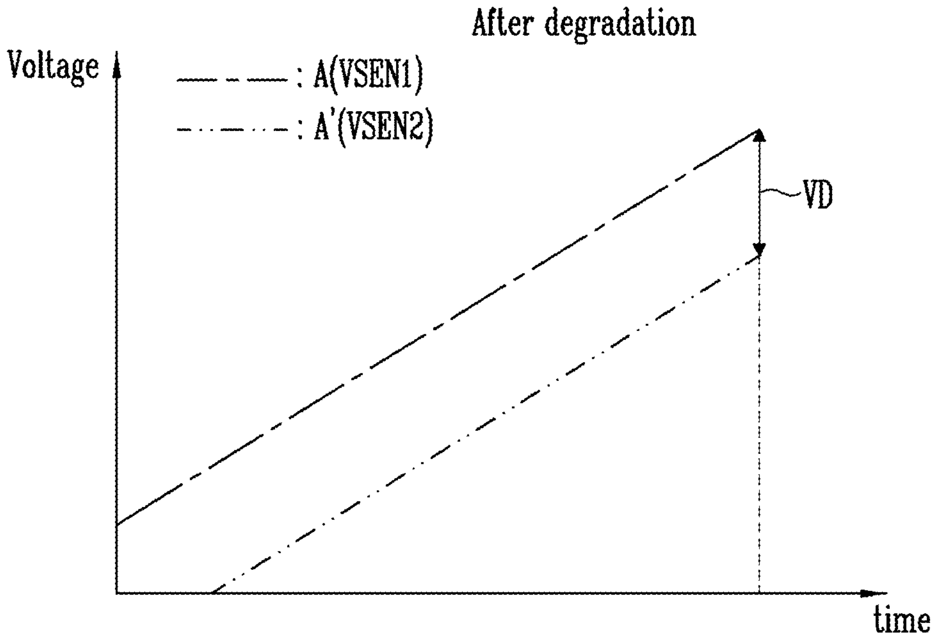
FIG. 13 illustrates a graph of area A of FIG. 10 and area A' of FIG. 11 after a third transistor is photo-degraded, according to an embodiment.

FIG. 9 illustrates a timing diagram of an example in which the display device of FIG. 1 operates in the first to third color sensing periods, according to an embodiment, FIG. 10 illustrates a timing diagram of an example in which the display device of FIG. 1 operates in a first sensing period, according to an embodiment, FIG. 11 illustrates a timing diagram of an example in which the display device of FIG. 1 operates in a second sensing period, according to an embodiment, FIG. 12 illustrates a graph of area A of FIG. 10 and area A' of FIG. 11 before a third transistor is photo-degraded, according to an embodiment, and FIG. 13 illustrates a graph of area A of FIG. 10 and area A' of FIG. 11 after a third transistor is photo-degraded, according to an embodiment.

In an embodiment and referring to FIG. 1 and FIG. 9, the data driver 400 may provide a data voltage to the sub-pixel SPX through the data line DL in the display period. The data driver 400 may provide the reference voltage VREF to the sub-pixel SPX in the period in which the characteristics of the sub-pixel SPX are sensed. For example, in the period in which the characteristics of the sub-pixel SPX are sensed, the display device may not display an image.

In an embodiment, the driving controller 200 may independently sense each of the characteristics of the sub-pixels SPX1 to SPX3. For example, when sensing a characteristic of one of the sub-pixels SPX1 to SPX3, the data driver 400 may provide the reference voltage VREF to the one of the sub-pixels and provide the standby voltage STAV to the remaining ones except for the one of the sub-pixels. For example, the standby voltage STAV may be lower than the reference voltage VREF.

For example, in an embodiment, in the first color sensing period CS1 that senses the characteristics of the first sub-pixel SPX1, the data driver 400 may provide the reference voltage VREF to the data line DL connected to the first sub-pixel SPX1 and provide the standby voltage STAV to the data lines DL connected to the sub-pixels SPX2 and SPX3. For example, in the second color sensing period CS2 that senses the characteristics of the second sub-pixel SPX2, the data driver 400 may provide the reference voltage VREF to the data line DL connected to the second sub-pixel SPX2 and provide the standby voltage STAV to the data lines DL connected to the sub-pixels SPX1 and SPX3. For example, in the third color sensing period CS3 that senses the characteristics of the third sub-pixel SPX3, the data driver 400 may provide the reference voltage VREF to the data line DL connected to the third sub-pixel SPX3 and provide the standby voltage STAV to the data lines DL connected to the sub-pixels SPX1 and SPX2.

In an embodiment, sensing is performed in the order of the first sub-pixel SPX1, the second sub-pixel SPX2, and the third sub-pixel SPX3, but the invention is not limited thereto.

In an embodiment, it is described as an example that the reference voltage VREF and the standby voltage STAV are selectively provided to the data line DL to independently sense each of the characteristics of the sub-pixels SPX1 to SPX3, but the invention is not limited thereto. For example, when the sub-pixels SPX1 to SPX3 do not share the sensing line SL and each of the sub-pixels SPX1 to SPX3 is connected to a different sensing line SL, the data driver 400 may simultaneously provide the reference voltage VREF to the sub-pixels SPX1 to SPX3, and the driving controller 200 may simultaneously sense the characteristics of the sub-pixels SPX1 to SPX3.

In an embodiment and referring to FIG. 9 to FIG. 11, each of the color sensing periods CS1 to CS3 may include a first sensing period SP1 and a second sensing period SP2.

In an embodiment, the gate driver 300 may provide a sensing control signal SS having a first voltage V1 to the sub-pixel SPX in the first sensing period SP1, and provide a sensing control signal SS having a second voltage V2 different from the first voltage V1 to the sub-pixel SPX in the second sensing period SP2.

In an embodiment, the data driver 400 may receive the first sensing voltage VSEN1 from the sub-pixel SPX through the sensing line SL in the first sensing period SP1, and receive the second sensing voltage VSEN2 from the sub-pixel SPX through the sensing line SL in the second sensing period SP2.

Here, the first sensing voltage VSEN1 may be the sensing voltage VSEN (see FIG. 8) received in the first sensing period SP1, and the second sensing voltage VSEN may be the sensing voltage VSEN (see FIG. 8) received in the second sensing period SP2.

In an embodiment and referring to FIG. 8 and FIG. 10, the first sensing period SP1 may include an initialization period IP and a sensing input period SIP.

In the initialization period IP, the scan control signal SC and the sensing control signal SS may have off levels, the first switch SW1 may be turned on, and the second switch SW2 may be turned off. Accordingly, the first sensing voltage VSEN1 charged in the sensing capacitor CSEN may be the initialization voltage VINIT.

In the sensing input period SIP, the scan control signal SC and the sensing control signal SS may have on levels, the first switch SW1 may be turned off, the second switch SW2 may be turned on, and the reference voltage VREF may be applied to the data line DL. Accordingly, the reference voltage VREF may be applied to the first node N1, the first transistor T1 may generate a driving current corresponding to the reference voltage VREF, and the first sensing voltage VSEN1 may increase by the driving current. The data driver 400 may provide the first sensing voltage VSEN1 charged in the sensing capacitor CSEN during the sensing input period SIP to the driving controller 200 as the sensing data SD.

In an embodiment and referring to FIG. 10 and FIG. 11, the second sensing period SP2 is substantially the same as the first sensing period SP1 except for the voltage of the sensing control signal SS, so redundant descriptions thereof will be omitted.

In an embodiment and referring to FIG. 8, FIG. 12, and FIG. 13, the first sensing voltage VSEN1 and the second sensing voltage VSEN2 are values measured in a state in which conditions other than the voltage of the sensing control signal SS applied to the third transistor T3 are the same. As the third transistor T3 is light-degraded, the current transmission capability of the third transistor T3 may be changed. The difference VD between the first sensing voltage VSEN1 and the second sensing voltage VSEN2 may increase as the third transistor T3 is light-degraded. That is, the difference VD between the first sensing voltage VSEN1 and the second sensing voltage VSEN2 may vary depending on the current transmission capability of the third transistor T3. Accordingly, the driving controller 200 may sense the first characteristic of the sub-pixel SPX from the difference VD between the first sensing voltage VSEN1 and the second sensing voltage VSEN2.

In an embodiment, it is described as an example that the first characteristic is sensed from two sensing voltages VSEN, but the invention is not limited to the number of sensing voltages VSEN for sensing the first characteristic.

Figure 14:
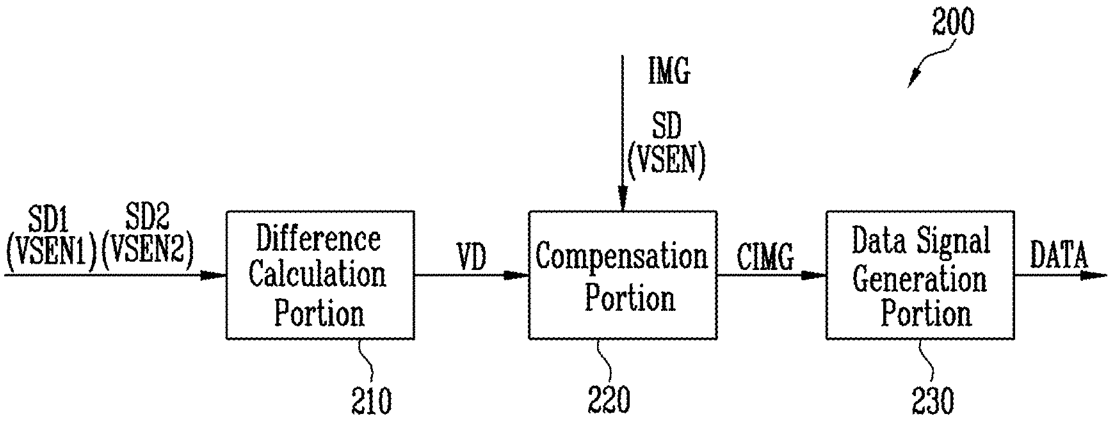
FIG. 14 illustrates a block diagram of an example of a driving controller of the display device of FIG. 1, according to an embodiment.

FIG. 14 illustrates a block diagram of an example of a driving controller of the display device of FIG. 1, according to an embodiment.

In an embodiment and referring to FIG. 14, the driving controller 200 may sense the first characteristic of the sub-pixel SPX from the sensing voltages VSEN1 and VSEN2 and may compensate for the input image data IMG based on the first characteristic. For example, the driving controller 200 may compensate for a luminance deviation due to a deviation of the first characteristic between the sub-pixels SPX. The driving controller 200 may sense the second characteristic of the sub-pixel SPX from one sensing voltage VSEN and compensate for the input image data IMG based on the second characteristic.

In an embodiment and as described above, when the data voltage is compensated (that is, the input image data IMG is compensated) by sensing only the second characteristic without considering the first characteristic, a luminance deviation may occur. Accordingly, the driving controller 200 may compensate for the luminance deviation caused by the distortion of the sensing voltage VSEN by compensating the input image data IMG based on the first characteristic.

In an embodiment and referring to FIG. 14, the first sensing data SD1 means sensing data SD for the first sensing voltage VSEN1, and the second sensing data SD2 means sensing data SD for the second sensing voltage VSEN2. In addition, the sensing data SD applied to a compensation portion 220 in FIG. 14 may be one of the first sensing data SD1 and the second sensing data SD2 or it may be sensing data SD for the sensing voltage VSEN received in a period other than the first sensing period SP1 (see FIG. 10) and the second sensing period SP2 (see FIG. 11).

In an embodiment, the driving controller 200 may include a difference calculation portion 210, the compensation portion 220, and a data signal generation portion 230.

The difference calculation portion 210 may receive the sensing data SD1 and SD2 to calculate the difference VD between the first sensing voltage VSEN1 and the second sensing voltage VSEN2.

In an embodiment, the compensation portion 220 may compensate the input image data IMG to generate compensated image data CIMG and may receive the sensing data SD and the difference VD, and compensate the input image data IMG based on the sensing voltage VSEN and the difference VD.

In an embodiment, the driving controller 200 may compensate (hereinafter referred to as 'first compensation') the input image data IMG based on the sensing voltage VSEN to compensate for the deviation of the second characteristic between the sub-pixels SPX. In addition, the driving controller 200 may compensate (hereinafter referred to as 'second compensation') the input image data in which the first compensation is performed based on the difference VD to compensate for the distortion of the sensing voltage VSEN due to the deviation of the first characteristic during the first compensation process.

In an embodiment, as the third transistor T3 is light-degraded, the voltage reduction amount of the voltage passing through the third transistor T3 may decrease. That is, the sensing voltage VSEN may be greater after light-degradation than before light-degradation. Accordingly, when the driving controller 200 increases the data voltage as the sensing voltage VSEN increases in the first compensation process, the driving controller 200 may decrease the data voltage as the difference VD increases in the second compensation process.

In an embodiment, the data signal generation portion 230 may receive the compensated image data CIMG to generate the data signal DATA.

In various embodiments, the difference calculation portion 210, the compensation portion 220, and the data signal generation portion 230 may be implemented in the form of hardware, software, firmware, or an application-specific integrated circuit (ASIC).

Figure 15:
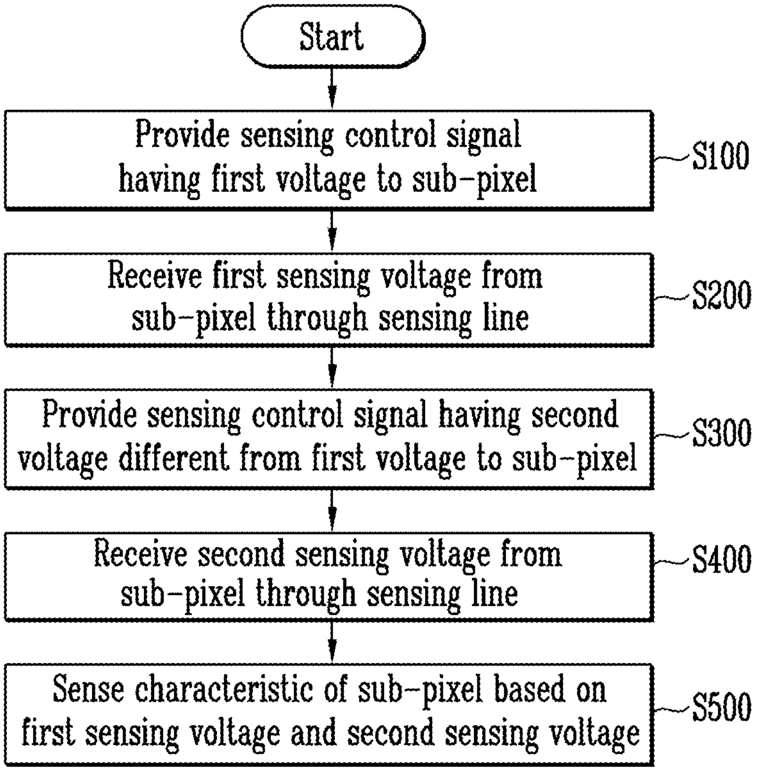
FIG. 15 illustrates a flowchart of a driving method of a display device according to an embodiment.

FIG. 15 illustrates a flowchart of a driving method of a display device, according to an embodiment.

In an embodiment and referring to FIG. 15, the driving method of the display device may include providing a sensing control signal having a first voltage to a sub-pixel (S100), receiving a first sensing voltage from a sub-pixel through a sensing line (S200), providing a sensing control signal having a second voltage different from the first voltage to the sub-pixel (S300), receiving a second sensing voltage from a first sub-pixel through a sensing line (S400), and sensing a characteristic of the first sub-pixel based on the first sensing voltage and the second sensing voltage (S500).

Step S100 to step S500 have been described in detail with reference to FIG. 1 to FIG. 14, so redundant descriptions thereof will be omitted.

Figure 16:
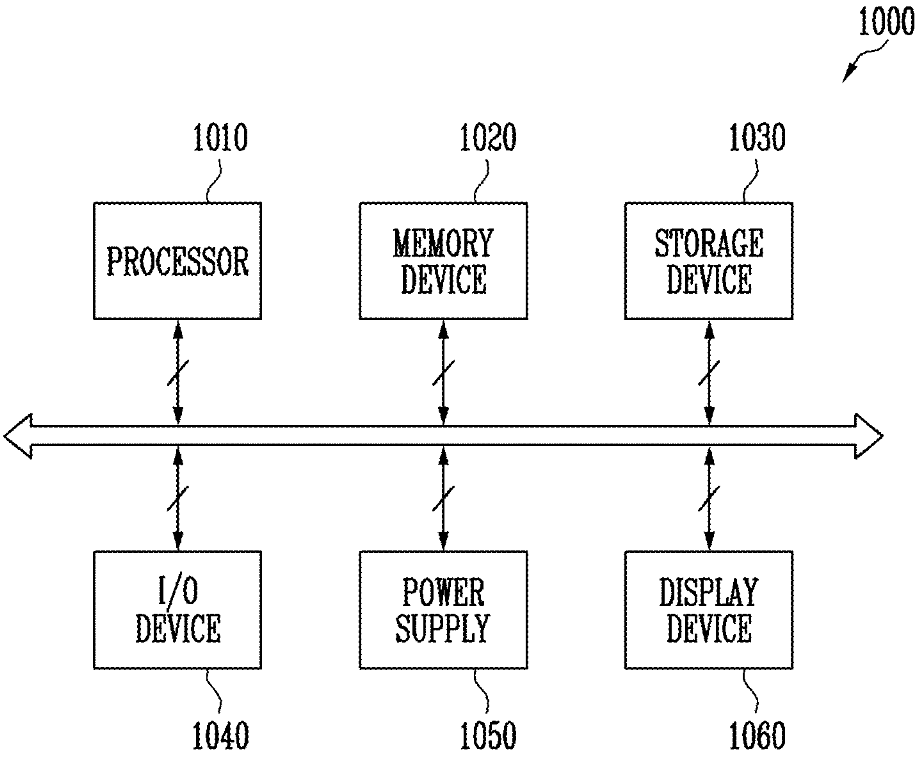
FIG. 16 illustrates a block diagram of an electronic device, according to an embodiment.
Figure 17:
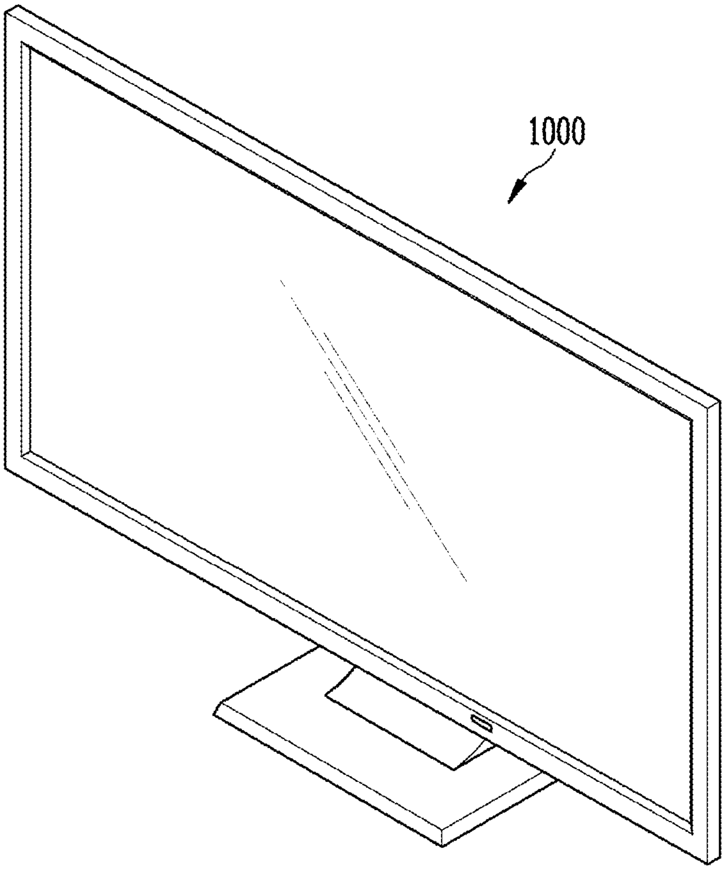
FIG. 17 illustrates an example in which the electronic device of FIG. 16 is implemented as a television, according to an embodiment.

FIG. 16 illustrates a block diagram of an electronic device, according to an embodiment, and FIG. 17 illustrates an example in which the electronic device of FIG. 16 is implemented as a smart phone, according to an embodiment.

In an embodiment and referring to FIG. 16 and FIG. 17, an electronic device 1000 may include a processor 1010, a memory device 1020, a storage device 1030, an input/output device 1040, a power supply 1050, and a display device 1060. In this case, the display device 1060 may be the display device of FIG. 1. In addition, the electronic device 1000 may further include several ports capable of communicating with a video card, a sound card, a memory card, a USB device, and the like, or communicating with other systems. In an embodiment, as shown in FIG. 17, the electronic device 1000 may be implemented as a television. However, this is an example, and the electronic device 1000 is not limited thereto. For example, the electronic device 1000 may be implemented as a mobile phone, a video phone, a smart pad, a smart watch, a tablet PC, a vehicle navigation, a computer monitor, a laptop, a head mounted display device, or the like.

In an embodiment, the processor 1010 may perform specific calculations or tasks. In some embodiments, the processor 1010 may be a micro-processor, a central processing unit, an application processor, or the like. The processor 1010 may be connected to other constituent elements through an address bus, a control bus, and a data bus. In some embodiments, the processor 1010 may also be connected to an extension bus such as a peripheral component interconnect (PCI) bus.

In an embodiment, the memory device 1020 may store data necessary for operations of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access memory (SRAM) device, and a mobile DRAM device.

In an embodiment, the storage device 1030 may include a solid state drive (SSD), a hard disk drive (HDD), a CD-ROM, and the like.

In an embodiment, the input/output device 1040 may include input devices such as a keyboard, a keypad, a touch pad, a touchscreen, mouse, and the like, and output devices such as a speaker, a printer, and the like. In an embodiment, the display device 1060 may be included in the input/output device 1040.

In an embodiment, the power supply 1050 may supply power necessary for the operation of the electronic device 1000. For example, the power supply 1050 may be a power management integrated circuit (PMIC).

In an embodiment, the display device 1060 may display an image corresponding to visual information of the electronic device 1000. In this case, the display device 1060 may be an organic light emitting display device or a quantum dot light emitting display device, but is not limited thereto. The display device 1060 may be connected to other constituent elements through the buses or other communication links.

Although certain embodiments and implementations have been described herein, other embodiments and modifications will be apparent from this description.

In an embodiment, the invention may be applied to a display device and an electronic device including the same. For example, the present disclosure may be applied to a digital TV, a 3D TV, a mobile phone, a smart phone, a tablet computer, a VR device, a PC, a home electronic device, a laptop computer, a PDA, a PMP, a digital camera, a music player, a portable game console, a navigation, and the like.

While the invention has been described in connection with what is presently considered to be practical embodiments, it is to be understood that the invention is not limited to the disclosed embodiments. Example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention. Thus, while various embodiments have been described above, those skilled in the art will appreciate that various modifications, additions and substitutions are possible, without departing from the scope and spirit of the invention.

What is claimed is:

1. A display device comprising:

a display panel including a first sub-pixel;

a gate driver that provides a sensing control signal having a first voltage to the first sub-pixel during a first sensing period and a sensing control signal having a second voltage different from the first voltage to the first sub-pixel during a second sensing period;

a data driver that receives a first sensing voltage from the first sub-pixel through a sensing line in the first sensing period and a second sensing voltage from the first sub-pixel through the sensing line in the second sensing period, and provides a data voltage to the first sub-pixel through a data line during a display period; and a driving controller that controls the data driver and the gate driver and senses a characteristic of the first sub-pixel based on the first sensing voltage and the second sensing voltage and senses the characteristic as a difference between the first sensing voltage and the second sensing voltage, and compensates the data voltage applied to the first sub-pixel based on the difference, wherein the data voltage decreases as the difference increases.

2. The display device of claim 1, wherein the driving controller comprises a difference calculation portion that calculates the difference between the first sensing voltage and the second sensing voltage, the first sensing voltage and the second sensing voltage being values measured in a state in which conditions other than a voltage of the sensing control signal applied to a third transistor are the same.

3. The display device of claim 2, wherein the driving controller comprises a compensation portion that compensates input image data to generate compensated image data based on a sensing voltage and difference, including a first compensation that compensates the input image data based on the sensing voltage and a second compensation that compensates the input image data based on the difference, and a data signal generation portion that generates a data signal based on the compensated image data.

4. The display device of claim 3, wherein the characteristic is a current transmission capability of a third transistor of the first sub-pixel.

5. The display device of claim 1, wherein the data driver provides a reference voltage to the first sub-pixel through a data line in the first sensing period and the second sensing period.

6. The display device of claim 5, wherein the gate driver provides a scan control signal to the first sub-pixel, wherein the first sub-pixel includes a first transistor including a control electrode connected to a first node, a first electrode connected to a first power line, and a second electrode connected to a second node;

a second transistor including a control electrode receiving the scan control signal, a first electrode connected to the data driver through the data line, and a second electrode connected to the first node;

a third transistor including a control electrode receiving the sensing control signal, a first electrode connected to the second node, and a second electrode connected to the data driver through the sensing line;

a storage capacitor including a first electrode connected to the first node and a second electrode connected to the second node; and a light emitting element including a first electrode connected to the second node and a second electrode connected to a second power line.

7. The display device of claim 6, wherein each of the first sensing period and the second sensing period includes an initialization period and a sensing input period, and the scan control signal and the sensing control signal have an off level during the initialization period and an on level during the sensing input period.

8. The display device of claim 1, wherein the display panel further includes a sensing capacitor including a first electrode connected to the sensing line and a second electrode connected to a reference power source, and the data driver includes a first switch connecting a power line to the sensing line, wherein an initialization voltage is applied to the sensing line.

9. The display device of claim 8, wherein the first sensing voltage and the second sensing voltage are voltages charged in the sensing capacitor.

10. The display device of claim 1, wherein the first sub-pixel displays a first color, the display panel further includes a second sub-pixel displaying a second color and a third sub-pixel displaying a third color, and the driving controller independently senses each of characteristics of the first to third sub-pixels.

11. The display device of claim 10, wherein when sensing a characteristic of one of the first to third sub-pixels, the data driver provides a reference voltage to the one of the first to third sub-pixels and provides a standby voltage to the remaining first to third sub-pixels.

12. The display device of claim 10, wherein each of the first to third sub-pixels includes a third transistor connected to the sensing line; and a light-emitting element, wherein a third transistor of at least one of the first to third sub-pixels overlaps a first electrode of the light emitting element of the at least one of the first to third sub-pixels in a plan view.

13. A driving method of a display device, comprising:

providing a sensing control signal having a first voltage to a first sub-pixel;

receiving a first sensing voltage from the first sub-pixel through a sensing line;

providing the sensing control signal having a second voltage which is different from the first voltage to the first sub-pixel;

receiving a second sensing voltage from the first sub-pixel through the sensing line;

providing, during a display period, a data voltage to the first sub-pixel through a data line;

sensing a characteristic as a difference between the first sensing voltage and the second sensing voltage; and compensating the data voltage applied to the first sub-pixel based on the difference, wherein the data voltage decreases as the difference increases.

14. The driving method of the display device of claim 13, further comprising providing a reference voltage to the first sub-pixel through a data line.

15. The driving method of the display device of claim 13, further comprising sensing a characteristic of a second sub-pixel displaying a second color, wherein the first sub-pixel displays a first color, and wherein the characteristic of the second sub-pixel is independently sensed from the characteristic of the first sub-pixel.

16. The driving method of the display device of claim 15, wherein when sensing the characteristics of the second sub-pixel, a standby voltage is provided to the first sub-pixel and a reference voltage is provided to the second sub-pixel.

17. The driving method of the display device of claim 13, wherein the characteristic of the first sub-pixel is sensed by a difference between the first sensing voltage and the second sensing voltage, and wherein the first sensing voltage and the second sensing voltage are values measured in a state in which conditions other than the voltage of the sensing control signal are the same.

18. The driving method of the display device of claim 17, further comprising compensating for a data voltage applied to the sub-pixel based on the characteristic of the first sub-pixel, wherein the compensating comprises performing a first compensation based on at least one of the first sensing voltage and the second sensing voltage and performing a second compensation based on the difference.

19. The driving method of the display device of claim 18, wherein when the driving controller increases the data voltage as a sensing voltage increases in a first compensation process, the driving controller decreases the data voltage as the difference between the first sensing voltage and the second sensing voltage increases in a second compensation process.

20. An electronic device, comprising:

a display device having a display panel, wherein the display panel includes, a first sub-pixel;

a gate driver that provides a sensing control signal having a first voltage to the first sub-pixel during a first sensing period and a sensing control signal having a second voltage different from the first voltage to the first sub-pixel during a second sensing period;

a data driver that receives a first sensing voltage from the first sub-pixel through a sensing line in the first sensing period and a second sensing voltage from the first sub-pixel through the sensing line in the second sensing period, and provides a data voltage to the first sub-pixel through a data line during a display period; and a driving controller that controls the data driver and the gate driver and senses a characteristic of the first sub-pixel based on the first sensing voltage and the second sensing voltage, and senses the characteristic as a difference between the first sensing voltage and the second sensing voltage, and compensates the data voltage applied to the first sub-pixel based on the difference, wherein the data voltage decreases as the difference increases.

* * * * *